United States Patent
Gomez

(10) Patent No.: US 9,454,217 B1
(45) Date of Patent: Sep. 27, 2016

(54) MONITORING, CONTROLLING AND REDUCING VAMPIRE POWER USING A CENTRAL CONTROLLER IN A NETWORK OF POWER SWITCH ROUTERS

(75) Inventor: Rafael Gomez, Cupertino, CA (US)

(73) Assignee: Hannext, LLC, Cupertino, CA (US)

( * ) Notice: Subject to any disclaimer, the term of this patent is extended or adjusted under 35 U.S.C. 154(b) by 1161 days.

(21) Appl. No.: 13/039,749

(22) Filed: Mar. 3, 2011

(51) Int. Cl.
*G06F 1/32* (2006.01)

(52) U.S. Cl.
CPC .......... *G06F 1/3287* (2013.01); *G06F 1/3203* (2013.01)

(58) Field of Classification Search
CPC .......................... G06F 1/3203; G06F 1/3287
USPC ........................................................ 713/300
See application file for complete search history.

(56) References Cited

U.S. PATENT DOCUMENTS

| | | | | |
|---|---|---|---|---|
| 7,113,455 | B2* | 9/2006 | Numano et al. | 369/30.08 |
| 2002/0162033 | A1* | 10/2002 | Maxwell et al. | 713/300 |
| 2005/0071689 | A1* | 3/2005 | Coward | G06F 1/189 |
| | | | | 713/300 |
| 2008/0201595 | A1* | 8/2008 | Kawasaki | 713/330 |
| 2009/0177800 | A1* | 7/2009 | Gidron et al. | 709/248 |
| 2010/0145542 | A1* | 6/2010 | Chapel | H02J 13/0082 |
| | | | | 700/295 |
| 2010/0169468 | A1* | 7/2010 | Emori | 709/220 |
| 2011/0055611 | A1* | 3/2011 | Sharma et al. | 713/324 |
| 2011/0074598 | A1* | 3/2011 | Cornwall et al. | 340/870.01 |
| 2011/0181401 | A1* | 7/2011 | Walley et al. | 340/13.23 |
| 2011/0202189 | A1* | 8/2011 | Venkatakrishnan et al. | 700/286 |
| 2012/0071149 | A1* | 3/2012 | Bandyopadhyay et al. | 455/418 |
| 2012/0290232 | A1* | 11/2012 | Kudo et al. | 702/62 |

* cited by examiner

*Primary Examiner* — Robert Cassity
(74) *Attorney, Agent, or Firm* — Donald R. Gibson

(57) ABSTRACT

A system and method are disclosed for monitoring, controlling and reducing power in electronic devices and appliances, specifically the standby or vampire power. The system includes a central controller and one or more power switch routers (PSR). The one or more PSRs are networkable and the controller and one or more PSRs communicate by a wireless connection. The central controller and the one or more PSRs may be coupled in a network, where the network may be either a star network or a mesh network, or a combination of a star and mesh network. The resulting network is a scalable AC power switch network that may be remotely or locally controlled with advanced metering telemetry. To reduce vampire power, the PSRs are able to accurately measure the power consumption, measuring the neutral power line, and communicate information to the central controller.

22 Claims, 7 Drawing Sheets

MONITORING, CONTROLLING AND REDUCING VAMPIRE POWER USING A CENTRAL CONTROLLER IN A NETWORK OF POWER SWITCH ROUTERS

TECHNICAL FIELD

The present application generally relates to apparatus and methods of monitoring, controlling and reducing power in electronic devices and systems, specifically the standby or vampire power.

BACKGROUND

Government agencies, utility agencies and customers are becoming aware of the real cost of producing electricity. These increasing costs of production, the effects on the environment, and the dependence on foreign resources has driven our economy to develop alternative "green", more localized, energy production systems. One area that has not garnered as much attention is the waste of electricity and most importantly, the standby or "vampire" power consumption. This is the power consumed by electronic devices when they are switched off or in a stand-by mode. On average, household electronics may consume 40% of their electricity while the devices are in stand-by mode. An energy policy that identifies sources of waste (including stand-by power) and develops a methodology to mitigate and control them is now feasible due to the recent advances in technology.

Stand-by power has exponentially increased with the advances in new electronic appliances and devices. The devices now have remote controls, quick starts and stand-by modes that continue to use power while plugged in, regardless if the device is being used or not. Homes and offices, big and small, throughout the country have millions of electronic devices plugged to the AC power outlets (or outputs) continuously, with the vast majority in an idling/standing-by mode the majority of the day. In this stand-by mode, power consumption is certainly not negligible. Typically, devices and appliances are utilized for short periods throughout the day, and they may be connected and drawing power 24/7 & 365 days a year. Vampire appliances, such as computers, stereos and DVD players in "stand by" mode may increase a household's monthly bill by at least 10 percent. Therefore, it may be beneficial to develop systems and methods that are capable of monitoring, reducing and controlling vampire power.

SUMMARY

The present specification is directed systems and methods that are capable of monitoring, controlling and reducing vampire power. The system may include a controller and one or more power switch routers (PSR). The one or more PSRs may be networkable and the controller and one or more PSRs may communicate by a wireless connection. Moreover, the controller and two or more PSRs may be joined in a network, where the network may be either a star network or a mesh network, or a combination of a star and mesh networks. A single PSR is not a network although functionally possible. A star PSR is a PSR configured for a star network and a mesh PSR is a PSR configured for a mesh network. The resulting network is a scalable AC power switch network that may be remotely or locally (i.e. manually) controlled, and monitored with advanced metering telemetry. To effectively reduce vampire power the PSR has to be capable of accurately measuring the power consumption and communicating information to the central controller for the software to act according to user inputs.

The PSR includes a monitoring device that further comprises a power metering device and a temperature sensor, a processor, an AC switch bank that supports 1 to N AC power outputs; and a wireless interface. The power metering device has a resolution of at least $1/1000$ of a watt and an accuracy of less than 1% at high and low power readings. The temperature sensor provides current temperature at the power switch router location. A accuracy of less that 1% means that the difference between the measurement and the actual value is less than 1%). The processor includes firmware that controls the interfaces of the controller, controls switches and lights, monitors status alarms, anomalies, and controls synchronization. Additionally, the firmware manages protocol stack and manages interfaces with application layer software.

BRIEF DESCRIPTION OF THE DRAWINGS

The components in the figures are not necessarily to scale, emphasis instead being placed upon illustrating the principles of the present application. In the figures, like reference numerals designate corresponding parts throughout the different views.

DETAILED DESCRIPTION

As described in the Background, it may be beneficial to develop systems and methods that are capable of monitoring, controlling and reducing vampire power. Although unplugging or otherwise disconnecting electronic appliances and circuits may mitigate the consumption of stand-by power, manual techniques are neither practical nor useful to address the broad issues. The present specification describes circuits, networks and methods that provide efficient and cost effective solutions to monitor, control and reduce power, especially vampire power.

DEFINITIONS

Vampire power—The power consumption resulting—from appliances and other electronic devices when the appliance or device is in a stand-by mode.

PSR—A "power switch router" is a networkable element that may assist in the monitoring, reduction and control of vampire power.

Software—Upper (application) layer. Contains the GUI (graphical user interface) and the user functions, the web service function (to interface with Internet connected devices, smartphones, other heterogeneous networks), the NMS (network management system), and API function to communicate with the Firmware in the Network Controller to access PSRs in the network.

API—An application program interface (API—and sometimes spelled application programming interface) is the specific method prescribed by a computer operating system or by an application program by which a programmer writing an application program can make requests of the operating system or another application. An API may be contrasted with a graphical user interface or a command interface (both of which are direct user interfaces) as interfaces to an operating system or a program.

Firmware—Firmware resides in the processor MPU-RISC 401 of the PSR or Network Coordinator. Firmware is used for low level hardware control, protocol stack, and interface to the upper layer software.

Network Coordinator (or Central Network Coordinator)—An element of the "controller" that maintains the network integrity, performs automatic retries when a PSR node goes off line unexpectedly, and communicates with the Software through API commands. Optionally includes visible indicators of anomalies.

Figure 6:
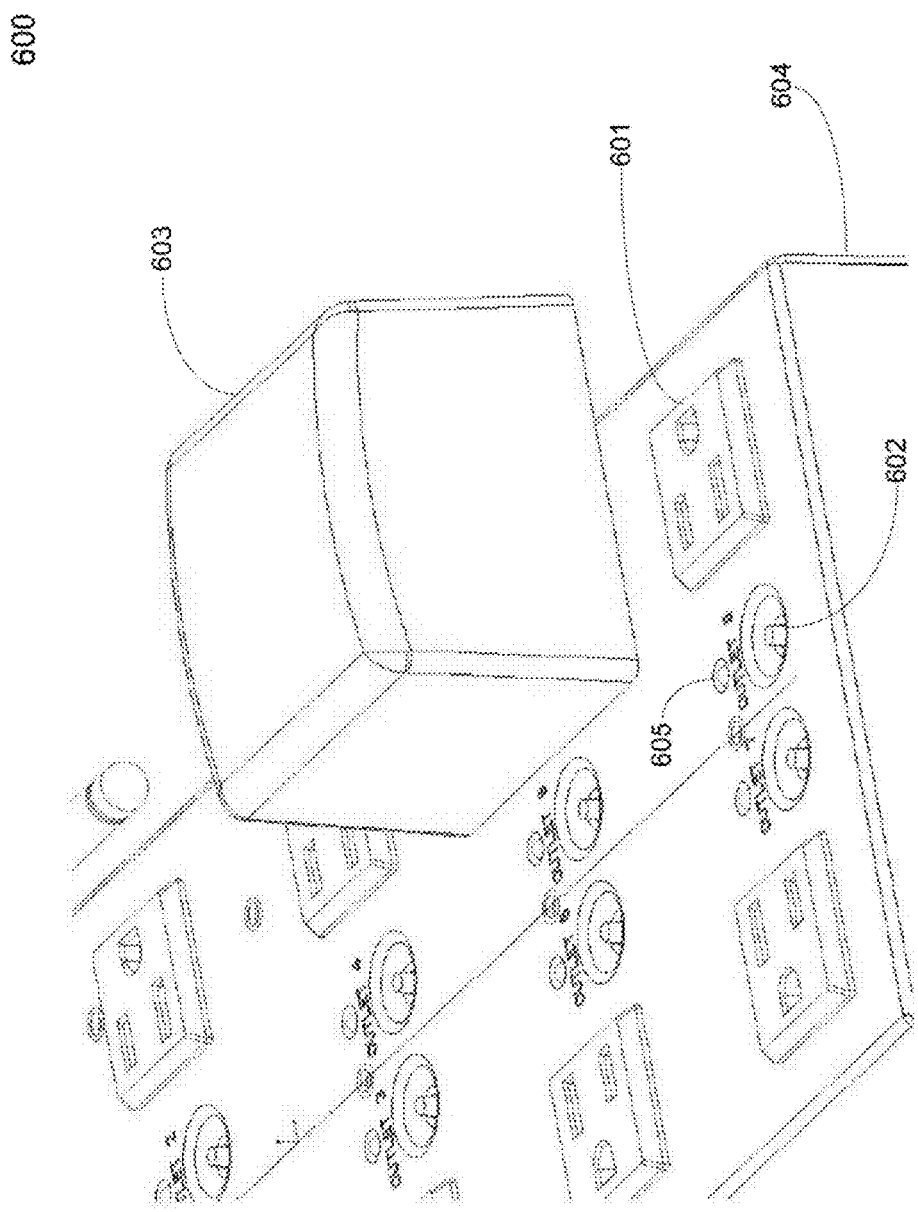
FIG. 6 illustrates a power chassis according to one embodiment present specification.

Power outlet or power output are synonymous terms in the present specification. Further the power outlet and power output may be a AC power outlet, as illustrated in FIG. 6, or they may have another type of interface. Power outlets and power outputs may be incorporated in a power strip or other type of chassis. Many installation embodiments are possible including embedding the chassis into a wall of a cubicle.

A system for monitoring, reducing and controlling vampire power may include a controller and one or more power switch routers (PSR). The one or more PSRs may be networkable and the controller and one or more PSRs may communicate by a wireless connection. Moreover, the controller and two or more PSRs may be joined in a network, where the network may be either a star network or a mesh network, or a combination of a star and mesh networks. A single PSR is not a network although functionally possible. A star PSR is a PSR configured for a star network and a mesh PSR is a PSR configured for a mesh network. The resulting network is a scalable AC power switch network that may be remotely or locally (i.e. manually) controlled, and monitored with advanced metering telemetry. To effectively reduce vampire power the PSR has to be capable of accurately measuring the power consumption and communicating information to the central controller for the software to act according to user inputs.

Figure 1:
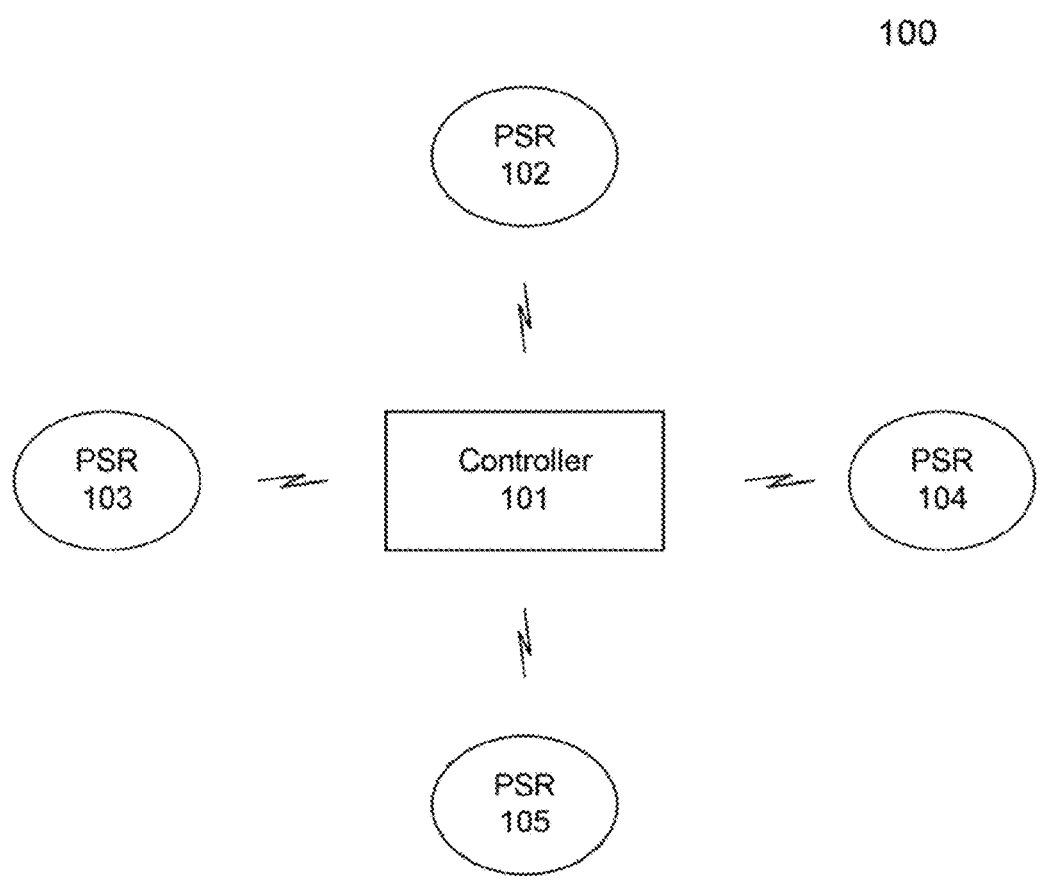
FIG. 1 illustrates a star network embodiment of a system for monitoring and controlling vampire power according to one embodiment of the present specification.

The requirements for the network may vary depending on the complexity of the environment. Generally, the requirements for a home environment may be less complex than for an office environment. For simpler environments, a star network, as illustrated in FIG. 1, may be sufficient to meet the requirements of the network. As shown in FIG. 1, embodiment 100 includes PSR 102, PSR 103, PSR 104, and PSR 105. These star PSRs are wirelessly coupled to controller 101. The functionality of the star PSRs in embodiment 100 may be the same. In operation, the star PSRs have different MAC addresses so they may be individually identified and accessed.

Figure 2:
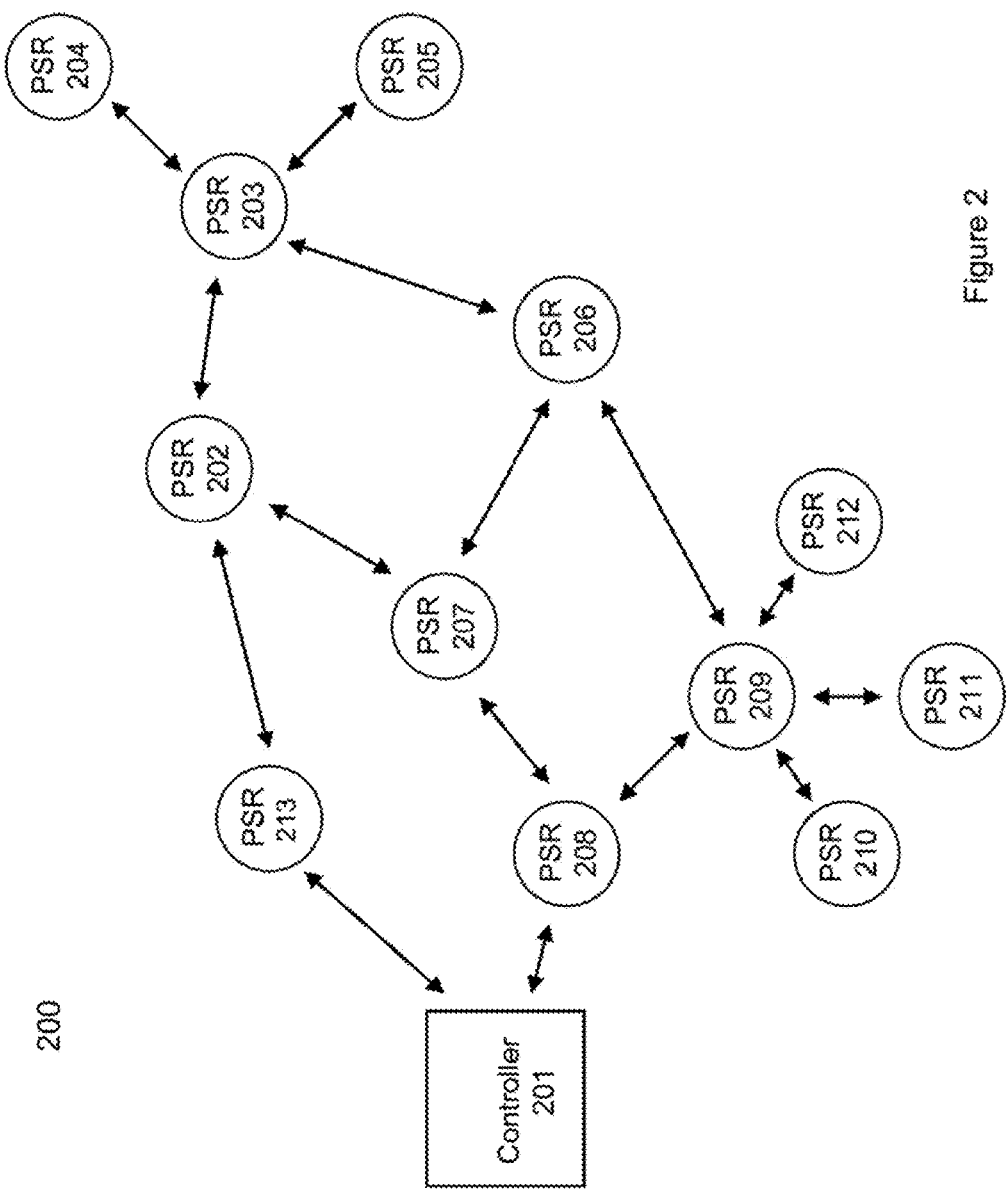
FIG. 2 illustrates a mesh network embodiment of a system for monitoring and controlling vampire power according to one embodiment of the present specification.

For more complex environments, a mesh network may be effective to provide connectivity to the appliances and electronic circuits. FIG. 2 illustrates a mesh network of distributed PSR nodes. As shown in FIG. 2, embodiment 200 comprises eleven mesh PSRs, including PSR 202 through PSR 213. The mesh network is controlled by controller 201. The functionality of each of the mesh PSRs in embodiment 200 may be the same. Additionally, the functionality of the star PSRs may be the same as the mesh PSRs. In operation, the mesh PSRs have different MAC addresses so they may be individually identified and the mesh PSRs have knowledge of the MAC address of the adjacent mesh PSRs.

In mesh networks, one or more mesh PSRs are wirelessly coupled to controller 201. For example, in embodiment 200, PSR 213 and PSR 208 are wirelessly coupled to controller 201. The remaining mesh PSRs communicate to controller 201 via the routing functionality of the other mesh PSRs. For example, packets from PSR 204 may be routed through PSR 203, then routed through PSR 202, then routed through PSR 213, then routed to controller 201. Controller 201 is configured to support the aforementioned routing functionality. A mesh network may incorporate a star network within the mesh network.

A technical solution proposed in the present specification is a system with hardware and software sub-systems to monitor, control and reduce stand-by power in homes and offices. The hardware and software sub-systems will now be discussed.

Hardware Sub-System.

The Hardware sub-system includes of a low power wireless router that may utilize the IEEE 802.15.4 standard as the basis for the physical layer interface. This router may be networked in a mesh fashion from 2 to "N" (where "N" is a finite number between 50 and 100), according to the requirements and necessities of the user. Use of a single router is possible, although may not be considered a network.

The routers in a given network may be bound to a controller, PC or gateway device which acts as a network coordinator using a USB dongle containing the IEEE 802.15.4 wireless interface, providing the controller does not have the interface already built in. A router, in the network, may connect to the controller either directly to or through other routers. The initial binding process, performed once, guarantees the security of the network since PSRs and Controllers are aware of themselves and no unbound PSR can become part of the network. The networks could be expanded beyond 100 routers by linking clusters of networks, performed in the upper Software, in similar fashion to current PC and computer networks. Power switch routers (PSR) may have a unique address that identifies it in the network it belongs. The controller keeps track of its routers and maintains the network. Every router may be bound and added to the network in order to be operational. The addressing scheme and number of bits in the address field varies depending on the selected protocol. The system may utilize the protocols stack of Zigbee or 6LoWPAN. The controller may include network software and graphical user interface that displays network and status information.

The router, or network node, or PSR, may control the stand-by power by disconnecting devices plugged in the AC power and effectively removing their stand-by power consumption. The ON/OFF switching may be accomplished at the router while the command and control comes from the software sub-system through the PC controller or gateway device and the wireless network. Effectively, the power switch routers may reduce vampire power by disconnecting devices operating in stand-by mode based on local control or remote control. The router may have a targeted stand-by power of <400 mW.

The router may contain a precision power metering device and a temperature sensor for an information feedback that can be part of a closed loop control when configured to do so. The metering device is a single phase AC, 120 V, with a resolution of $\frac{1}{1000}$ of a Watt and an accuracy of less than 1% at high and low power readings. This device may exceed IEC62053/ANSIC12.20 standards and may provide information for: Irms, Vrms, Power (W), Energy (Wh), VAR (W), VA (W), Power Factor, Line frequency, Phase Angle, per load. The temperature sensor may provide current temperature at the router location. In all, every router node provides a distributed sensing and metering telemetry at the load points. This level of resolution may be required to identify and accurately measure stand-by power.

Stand-by control programming and power metering, singularly or combined, distributed through a low power wireless mesh network of routers may provide the tools that assists users reduce energy consumption. It may be extended to Utilities' Smart Grid networks for a better energy efficiency policy by helping implement energy demand response and AC load control.

Demand Response is a component of smart energy demand, which also includes energy efficiency, home and building energy management.

Software Sub-System.

The software sub-system has two components: The firmware, used for low level hardware control, protocol stack, and interface to the upper layer software, and the upper (application) layer software which includes the network software (NMS: Network Management System), the GUI (Graphical User Interface), and a web service interface running on a computer, PC or server. Upper (application) layer software is referred to as "software" in the present specification.

The firmware may reside and run in the SoC inside the router where it may interface directly with the different modules of the circuit, control the switch bank, and lights, and monitor the SPST bank. The firmware may also monitor alarms, communicate with other's stand alone SOCs (System on Chip) components, and manage the protocol stack and the bidirectional interface with application layer software through API commands. Hence, the synchronization, data collection, alarm monitoring, switch control functions, protocol stack, routing and binding tables are implemented in the firmware.

The firmware AC power control function may include a switch bank of relay elements, Rel1 to Reln. The firmware controls the relay switch elements based on the information coming from the wireless network (e.g. locally from the Software GUI interface, or remotely from a web browser or a smartphone), from the SPST bank and from internal monitoring algorithms (e.g. a safety threshold exceeded). The firmware performs synchronization of the random input events and sets the switch bank and light indicators in the PSR and internal registers to designate which outlet is active in the PSR. This information is passed through the network to the Software GUI through the API where it is shown on the PC display or passed down to a remote display through the Software web service.

The firmware schedules data, status collection from the monitor I/F SoC in a master/slave configuration of two independent, stand alone, subsystems, and passes control information from the Software to the monitor I/F.

The firmware in a mesh network performs a router function by which the PSR relays information to, and from other PSRs associated with it. This association of PSRs is established during the configuration of the network.

The upper layer software (software) may reside in a computer server, a PC containing the central controller that houses an IEEE 802.15.4, wireless interface for communicating with the PSRs in the network. The home and office systems may require different software sub-systems and configurations.

The software may include the NMS (network management system). The NMS keeps a topology of the network, manages the PSR network elements polling them periodically to update status including faults, configuration, alarms, performance, and security, and maintains a log of any events in the network.

The software may include the GUI (graphical user interface) running directly on the computer server or a PC that contains the central controller. The GUI provides direct interaction with the PSRs in the network and may use images instead of commands and text. The graphical control screen may allow the user to set up the switch banks in the PSRs in real time by point and click with immediate feedback, future scheduling with graphical calendars, display and set thresholds, display current and history information in charts or plots that could be superimposed to visualize events against time, including power (watts), current, volts, alarms, total cost, switch bank state, and other user configurable parameters.

The software may include automation of events based on user set timers, programmable preset buttons were non-critical equipment and appliances can be controlled ON or OFF real time or using schedulers and timers. The software automation may include monitoring of faults and conditions, internal to the network or external coming from Utility grid network regarding demand response, cost targets, and load control. The software automation may include PSR generated switch overrides that allow the user to extend a pre-programmed ON schedule. Software automatic messages to remote terminals, PCs and smartphones are capable of indicating event faults, report changes or user pre-assigned messages.

The software may include web services interface to allow remote access via the world wide web and smartphones through "apps" (application created specifically to interface with the software web services). The web services interface may allow for a bidirectional communication of data, creation of complex automated messaging based on set up parameter thresholds, system alarms, event completions, NMS faults and network disruptions. The web services interface allows the user to access the network from anywhere in the world and be informed of user programmed event completions and fault conditions via software web services messages.

Local activation of the AC switches by the user may be communicated by the router to the central controller where the software captures the event and displays the new "state" of the switches in the power switch router. For example, the product may be configured so that the routers in the network may have a selected number outlets connected to a non-critical equipment in the cubicles (pre-configured to be added to an ON/OFF software timer by the IT employee) and may disconnect from the AC power at a specific time at night or weekend and may reconnect before employees resume their normal day's work. If an employee comes back to the office during the OFF cycle and enables the outlets locally the software sub-system would allow him/her to work and will return to the "OFF" state automatically after some pre-determined duration of inactivity. Local activation by a user is communicated by the power switch router to the controller wherein software captures event and displays new "state" of the switches in the power switch router. Local and remote activation are synchronized according to a pre-assigned priority.

System configurations for an AC output include an interruptible (ON/OFF) AC output, and an always enabled AC output (non interruptible under software configuration), with LED "ON" state indicators, where the interruptible (ON/OFF) AC output is capable of being manually overridden for a pre-determined amount of time.

Through the Utility grid connectivity (via the Smart Meter or even through the WWW) the Upper Software ("software") will collect utility messages, information about cost per KW/h, demand response, total energy utilization. The system may facilitate this connectivity by having the capability to interface directly with IEEE 802.15.4 equipped smart meters.

Implementation

Figure 3:
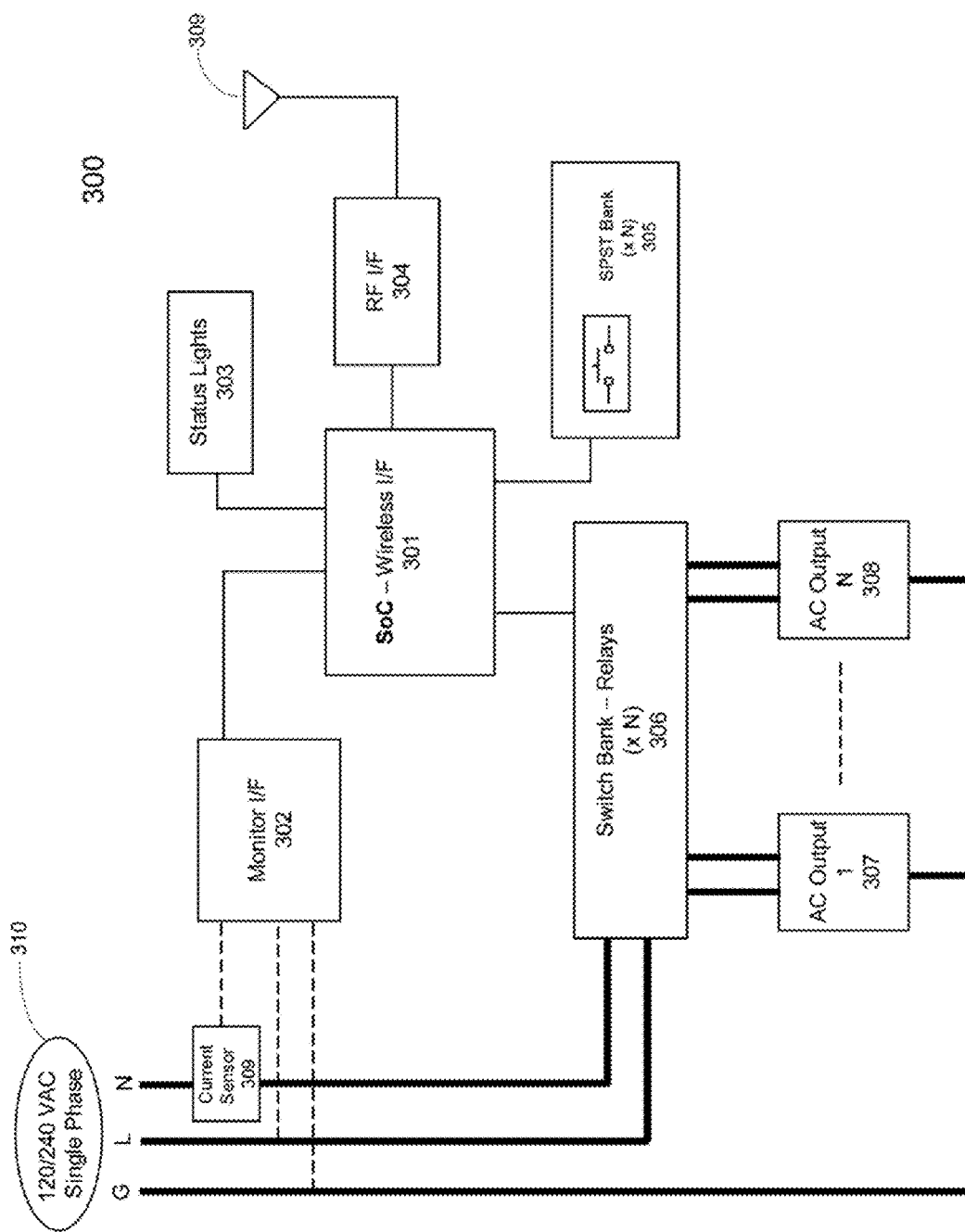
FIG. 3 illustrates a block diagram of a power switch router (PSR) according to one embodiment of the present specification.

FIG. 3 illustrates a block diagram of a power switch router (PSR) according to one embodiment of the present specification. As shown, embodiment 300 may include a system on a chip (SoC) with a wireless transceiver, SoC-Wireless I/F 301. The SoC-Wireless I/F 301 may include a processor with memory. The SoC-Wireless I/F 301 may be coupled to a RF interface, RF I/F 304, which in turn may be coupled to antenna 311.

SoC-Wireless I/F 301 may also be coupled to a Monitor I/F 302, Status Lights 303, N SPST Bank 305 and N Switch Bank-Relays 306. The N SPST Bank 305 and N Switch Bank-Relays 306 may have N elements (i.e. X N) in embodiment 300 of the power switch router. Accordingly, the N Switch Bank-Relays 306 may be coupled to AC Outlet 1-307 through AC Outlet N-308.

Monitor I/F 302 may be coupled to the current sensor 309 to monitor the N (neutral) power line. By extension the power switch router may monitor a neutral power line. Monitor I/F 302 may also monitor the G and L power lines. In embodiment 300, the power lines G, L and N are coupled to a 120/240 VAC single phase source 310

The N power line is coupled through the current sensor 309 to the N Switch Bank-Relays 306. The L power line is coupled to the N Switch Bank-Relays 306. The G power line is coupled to AC Outlet 1-307 through AC Outlet N-305, as illustrated in FIG. 3.

Figure 4:
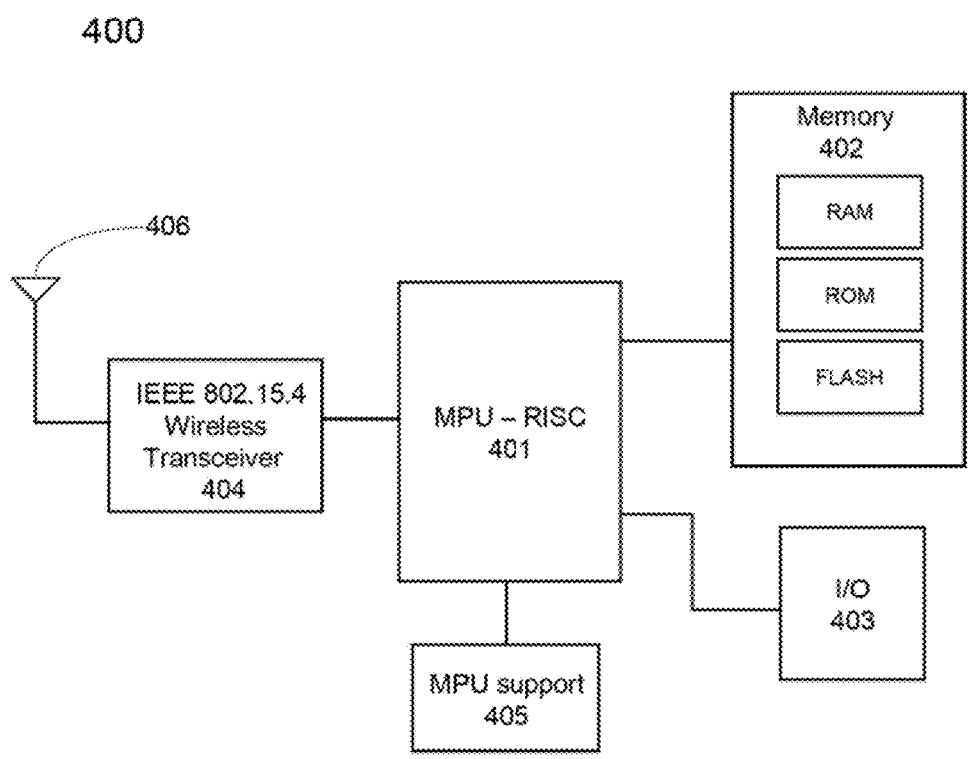
FIG. 4 illustrates a block diagram of the SoC-Wireless I/F of FIG. 3 according to one embodiment present specification.

FIG. 4 illustrates a block diagram of SoC-Wireless I/F 301 of FIG. 3. As shown, embodiment 400 may include a processor, MPU-RISC 401. MPU-RISC 401 may be coupled to memory 402 that may include RAM, ROM and Flash memory. MPU-RISC 401 may also be coupled to interface I/O 403, MPU support 405 and IEEE 802.15.4 Wireless Transceiver 404. Antenna 406 may be coupled to the output of the IEEE 802.15.4 Wireless Transceiver 404.

Figure 5:
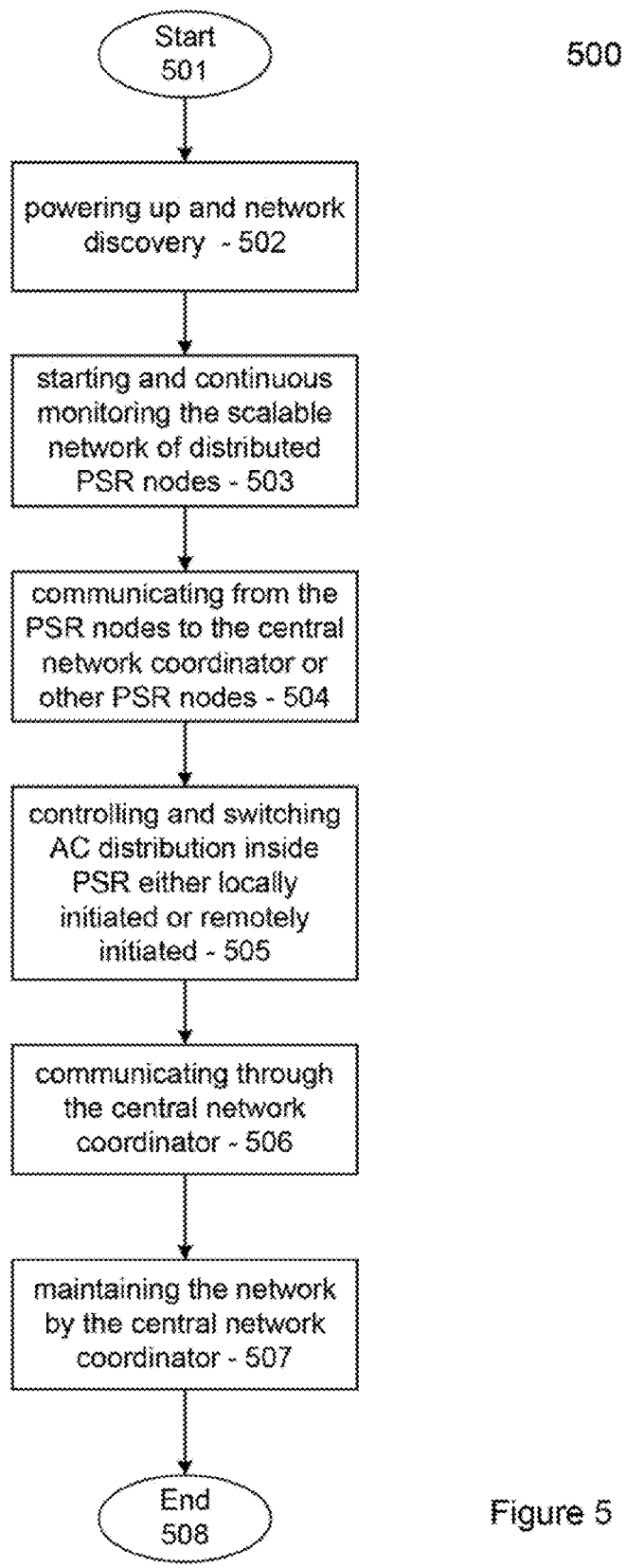
FIG. 5 illustrates a flow diagram for a method of reducing the vampire power in a network according to one embodiment present specification.

FIG. 5 illustrates a flow diagram for a method of reducing the vampire power in a network according to embodiment 500 of the present specification. The method is based on a scalable network of distributed PRS nodes and begins with Start 501 on FIG. 5 and includes the steps:
1. power up and network discovery 502. This step includes initialization and reporting of the pre-bound PSR nodes and central network coordinator.
2. start and continuous monitoring of the scalable network of distributed PSR nodes 503, wherein the scalable network configured either as a wireless mesh network or a wireless star network is controlled by a central network coordinator, wherein the monitoring is continuous at the PSR level and polled by the central network coordinator to fetch latest data from the PSRs.
3. communicating from the PSR nodes to the central network coordinator or other PSR nodes 504 with transmission/reception acknowledge signal,
4. controlling and switching AC distribution inside PSR either locally initiated or remotely initiated 505,
5. communicating through the central network coordinator 506,
6. maintaining the network by the central network coordinator 507 with visible indicators of anomalies and automatic retries when a PSR node goes off line unexpectedly.

The steps conclude with End 508.

Figure 7:
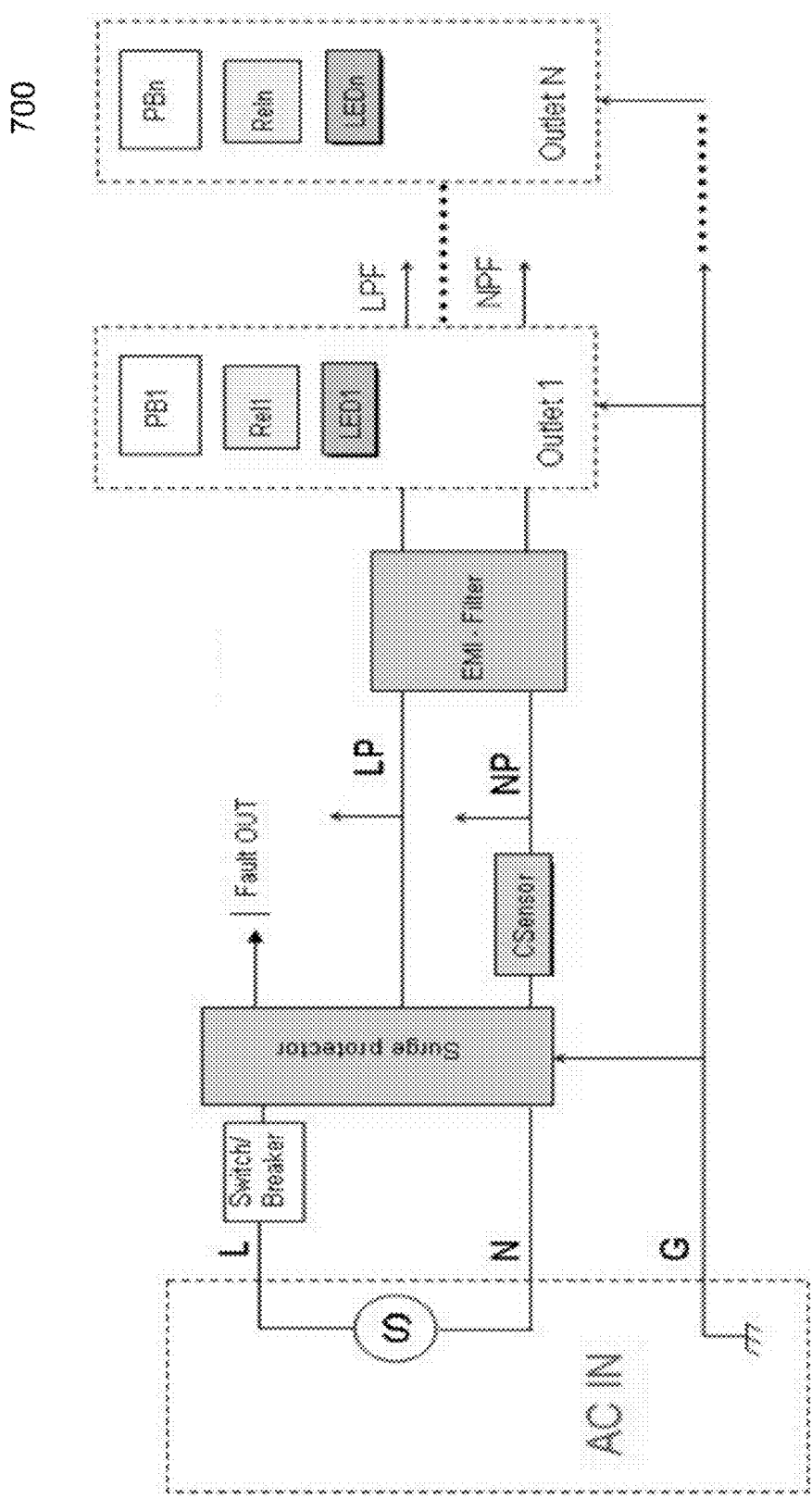
FIG. 7 illustrates a portion of the functions in a power chassis according to one embodiment present specification.

In this method, the PSR nodes comprise AC power monitoring, comprising watts, VA, VAR, current, voltage, phase, power factor, cost (KW/h), alarm monitoring, node temperature monitoring, surge protection (SPD—surge protection device), and surge protection fault monitoring, and detection of AC wiring anomalies and AC switch back control. Also, the PSR nodes add SPD and multi-pole EMI filter with CM choke (common mode). See FIG. 7 for an illustration of these components in a power chassis, as shown in embodiment 700. The SPD surge protection fault monitoring (Fault Out), as illustrated in FIG. 7.

Router Physical (Mechanical) Design.

One important consideration in the router may be the mechanical design. FIG. 6 illustrates a power chassis in embodiment 600. Some features of the mechanical design may include:
1. A manual override for AC output 601. This override operates as a toggle switch through the firmware in the SoC-Wireless I/F 301.
2. Recessed SPST switches 602 that activate the manual override relative to the chassis of the router to prevent accidental activation or deactivation of the switch bank. SPST switches 602 may operate as a push button switch.
3. The spacing may be carefully chosen to accommodate power cords and AC-DC adaptors 603 avoiding blocking adjacent AC outputs.
4. A design goal to produce a simple and clean looking chassis, easy to move and relocate, with user friendly, intuitive, control operation and light indicators suitable for offices, laboratories, homes, shops.

As illustrated in embodiment 600, in the chassis 604, the router hardware and circuitry may be "hidden" from view encased in a chassis. This chassis 604 may look familiar to the user, i.e. not foreign or intimidating, with a right color selection to blend with most surroundings. Each router outlet may have an LED light 605 to indicate when it has AC power and a SPST switch 602 to override the "state" of the outlet (or output) locally: An ON/OFF function may be available so the AC output may be controlled locally avoiding having to control it through the central controller.

In summary, a power switch router may comprise a chassis with several individually controlled power outputs. AC output spacing may be selected to accommodate power cords and AD-DC adapters and avoiding blocking adjacent AC outputs where AC power outputs have an LED light to indicate when the AC power output has AC power and a manual control to override ON/OFF state of the AC power output. Manual control may be facilitated by a switch or a push button or other control function that is recessed relative to case of the router to prevent accidental activation or deactivation of the switch. The chassis may be located on or embedded into a wall of an office or a wall of a cubicle.

One skilled in the art may recognize that other configurations of embodiment 600 may be possible.

Application/Installation

There may be two versions of the system: the home and the office version. Each version shares the hardware components, routers and USB wireless interface, and may share the firmware, drivers, protocol stacks, and parts of the software modules. The scope and size of the configurations in the home and office may make the software requirements very different, the home version may be simpler with more graphics, the office version more detailed, comprehensive, and more restrictive access. The additional features may include SPD (power surge protection) circuitry and EMI filters for special applications and conditions. These additional features are illustrated in FIG. 7, as shown in embodiment 700. Functions in the power chassis as illustrated in FIG. 7 may include:

Surge Protector—SPD surge protection device with fault monitoring

Fault Out—Output of the surge protector indicating the SPD has been damaged by a power surge and no longer operational Switch/Breaker—ON/OFF switch, to turn the PSR ON or OFF, plus a thermal circuit breaker for current overload protection L—Line—Phase Active connection N—Neutral—Return connection G—Ground—Safety connection to the earth or ground CSensor—Current sensor 309

LP—Protected Line

NP—Protected Neutral

EMI Filter—Electromagnetic interference low pass filter with high CMR common mode (noise) rejection.

Outlet 1 to Outlet N comprises components of the Switch Bank 306, SPST Bank 305 and AC output ON LED indicators PB1 to PBn—SPST Bank 305 component 1 to n.

Rel1 to Reln—a switch bank relay element 1 to n

LPF—Protected Filtered Line

NPF—Protected Filtered Neutral

While various embodiments of the application have been described, it will be apparent to those of ordinary skill in the art that many more embodiments and implementations are possible that are within the scope of this application. For example, any combination of any of the systems or methods described in this disclosure is possible. Further, these concepts may apply to any radio system.

What is claimed is:

1. A system for monitoring, controlling and reducing vampire power, the system comprising:
    a central controller that wirelessly communicates to a network of one or more power switch routers; and
    the one or more power switch routers, coupled to one or more electrical loads, (i) measure one or more AC power parameters for each of the one or more electrical loads, and (ii) wirelessly communicate the one or more AC power parameters for the each of the one or more electrical loads to the central controller,
    wherein the central controller determines a stand-by state for each of the one or more electrical loads by comparing the one or more AC power parameters for the each of the one or more electrical loads measured by the one or more power switch routers compared with stand-by values stored in a database of the central controller for each specific load type,
    wherein based on the comparison, if a particular electrical load is in a stand-by state, an associated power switch router disconnects the particular electrical load and eliminates vampire power for the particular electrical load,
    wherein the one or more power switch routers each comprise:
        a monitoring device that further comprises a power metering device and a temperature sensor, and
        an AC switch bank that supports 1 to N AC power outputs,
    wherein the one or more power switch routers each receive power from a single phase power source having an input AC neutral power line, and
    wherein the one or more power switch routers each monitors the input AC neutral power line in order to monitor functionality of the power metering device and to correct functionality of stand-by power state detection.

2. The system as in claim 1 wherein the central controller and the one or more power switch routers are coupled in a network, wherein the network is a wireless star network and/or a wireless mesh network.

3. The system as in claim 2 wherein the network is a scalable AC power switch network that remotely controls the one or more power switch routers, wherein number of power switch routers is scalable in the scalable AC power switch network.

4. The system as in claim 3 wherein system configurations for an AC power output comprise interruptible (ON/OFF) AC output, and an always enabled AC output (non interruptible under software configuration), with LED "ON" state indicators,
    wherein the interruptible (ON/OFF) AC output is capable of being manually overridden for a pre-determined amount of time.

5. The system as in claim 3 further comprising capability to interface directly with IEEE 802.15.4 equipped smart meters.

6. The system as in claim 1 wherein the central controller further comprises network software and graphical user interface that displays network and status information.

7. The system as in claim 1 wherein the temperature sensor provides current temperature at power switch router location.

8. The system as in claim 1 wherein a processor comprise firmware that controls wireless interfaces of the central controller, controls switches and lights, monitors status alarms, anomalies, and controls synchronization.

9. The system as in claim 8 wherein the firmware manages protocol stacks and manages interfaces with application layer software.

10. The system as in claim 8 wherein parametric thresholds are set to determine status, alarms and anomalies.

11. The system as in claim 1 wherein the one or more power switch routers have a manual override function for node in the network.

12. The system as in claim 1 wherein local activation by a user is communicated by the one or more power switch routers to the central controller wherein software captures event and displays new "state" of the switches in the power switch router.

13. The system as in claim 1 wherein local and remote activation are synchronized according to a pre-assigned priority.

14. The system as in claim 1 wherein software automatic messages to remote terminals, PCs and smartphones are capable of indicating event faults, report changes or user pre-assigned messages.

15. The system as in claim 1, wherein the central controller further comprising a central network coordinator, wherein network is controlled by the central network coordinator, wherein the monitoring is continuous at the one or more power switch routers and polled by the central network coordinator to fetch latest data from the power switch router.

16. The system as in claim 1, wherein the disconnection of the particular electrical load is further based on a pre-programmed timer, or based on direct intervention of a user.

17. A power switch router comprising:
  a hardware sub-system including a monitoring device that further comprises a power metering device and a temperature sensor, a processor, an AC switch bank that supports 1 to N AC power outputs; and a wireless interface; and
  a software sub-system including:
    firmware (embedded) for low level hardware control, protocol stack and interface to upper layer application software,
    the upper layer application software which includes network software (NMS: Network Management System), a GUI (Graphical User Interface), and a web service interface running on a computer, PC or server,
  wherein every router node provides a distributed sensing and metering telemetry at load points,
  wherein the power metering device, coupled to one or more electrical loads, measures one or more AC power parameters for each of the one or more electrical loads, and
  wherein the power switch router receives power from a single phase power source having an input AC neutral power line, and
  wherein the power switch router monitors the input AC neutral power line in order to monitor functionality of the power metering device and to correct functionality of stand-by power state detection.

18. The power switch router as in claim 17, further comprising a chassis with several individually controlled power outputs, wherein AC output spacing is selected to accommodate a multiplicity of power connectors for the electrical loads including power cords and AD-DC adapters of different sizes for avoiding blocking of adjacent AC outputs.

19. The power switch router as in claim 17 wherein a AC power output have an LED light to indicate when the AC power output has AC power and a manual control to override ON/OFF state of the AC power output, and wherein manual control of the power switch router is either a switch or a push button that is recessed relative to case of the router to prevent accidental activation or deactivation of the switch.

20. The power switch router as in claim 17, wherein a central controller determines a stand-by state for the one or more electrical loads by integrating and averaging over a period of time the one or more AC power parameters for the each of the one or more electrical loads measured by the power switch routers compared with stand-by values stored in a non-volatile memory or database, of the computer, PC, server, or central controller over the period of time for each specific load type.

21. A method of monitoring, controlling AC power and reducing vampire power in a scalable wireless network of distributed power switch routers comprising the steps of:
  at the power switch router:
    measuring one or more AC power parameters for each electrical loads coupled to the power switch router;
    communicating values of the one or more AC power parameters for each electrical load to a central controller;
    receiving from the central controller a determination of whether to disconnect a particular electrical load operating in stand-by mode; and
    disconnecting the particular load based on the determination by the central controller,
  wherein the determination by the central controller on whether to disconnect the particular load is based in part by comparing the one or more AC power parameters for the particular electrical load measured by the power switch routers with stand-by values stored in a database of the central controller, and
  wherein the power switch router receives power from a single phase power source having an input AC neutral power line, and
  wherein the power switch router comprises:
    a monitoring device that comprises the power metering device and a temperature sensor, and
    an AC switch bank that supports 1 to N AC power outputs, and
  wherein the power switch router monitors the input AC neutral power line.

22. The power switch router as in claim 20, wherein based on the comparison, if a particular electrical load is found in a stand-by state, a power switch router disconnects the particular electrical load and eliminates vampire power for the particular electrical load.

* * * * *